Figure 1:
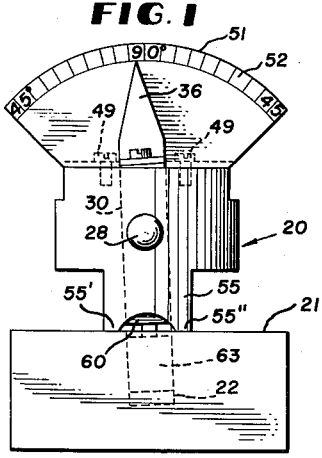

Dec. 24, 1963 E. PORTER 3,114,978
INTERNAL BORE MEASURING APPARATUS
Filed June 7, 1960 3 Sheets-Sheet 1

INVENTOR
EDWARD PORTER
BY Shoemaker and Mattare
ATTORNEYS

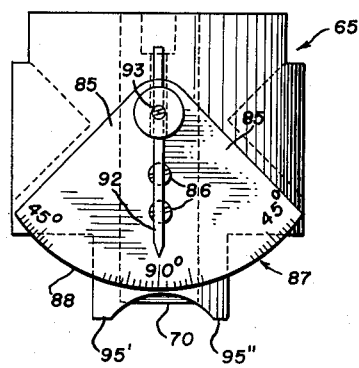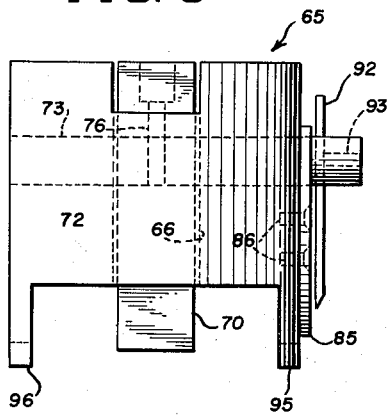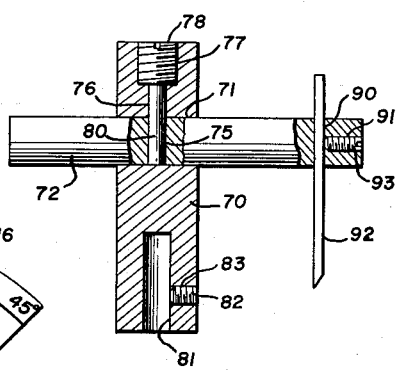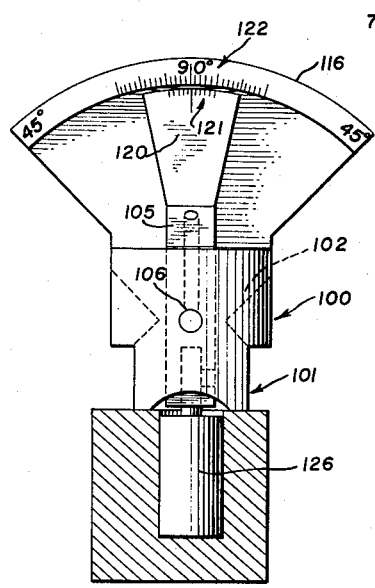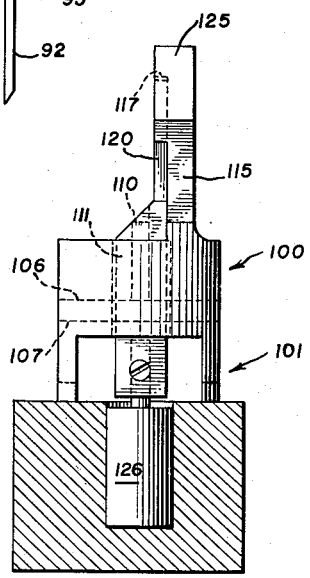

Dec. 24, 1963     E. PORTER     3,114,978
INTERNAL BORE MEASURING APPARATUS
Filed June 7, 1960     3 Sheets-Sheet 3

INVENTOR
EDWARD PORTER

BY *Shoemaker and Mattare*

ATTORNEYS

United States Patent Office 3,114,978
Patented Dec. 24, 1963

1

3,114,978
INTERNAL BORE MEASURING APPARATUS
Edward Porter, 7209 Charbonneau Drive,
Fort Worth, Tex.
Filed June 7, 1960, Ser. No. 34,442
8 Claims. (Cl. 33—174)

The present invention relates to a brand new and novel internal bore measuring apparatus, and more particularly to an apparatus for precisely measuring the angular disposition of a bore as well as the internal dimension thereof.

In many industrial applications, holes must be drilled in surfaces such as in the block of an engine or similar applications, these holes being drilled with a high degree of accuracy such that they are required to have a particular angular relationship and a precise inner dimension. Of course, these holes may comprise a bore in a shaft or may simply be a hole formed in a large flat surface or even a curved surface. After so forming these holes, it is necessary to determine that the holes have been accurately and properly formed. In order to check and measure the holes or bores, it is of course necessary to provide a measuring instrument or apparatus which is adapted to quickly and accurately determine if the hole has been formed according to specifications.

Firstly, it is necessary to determine with a high degree of accuracy that the hole has been properly angularly oriented and in most applications the holes or bores will be formed at an angle of 90° to the associated surface of the member in which the bore is formed. In addition, a second consideration is to provide apparatus which readily indicates whether or not the hole or bore is formed of a proper internal dimension.

The present invention relates to an apparatus for quickly and efficiently performing the dual function of measuring the internal dimension of the bore as well as the angularity thereof relative to the associated surface.

In the present invention, a body means is provided having a novel lower supporting portion which is so constructed as to universally adapt itself to various surfaces. In other words, the support means enables the body means to be effectively supported either upon a flat or a curved surface. This is accomplished by providing a plurality of spaced leg members at the lower portion of the body means.

The angularity of the bore is determined by means of an arm which is pivotally supported by the body means and is adapted to register with a scale formed on or supported by the body means, the position of the arm being determined by the angular relationship of the bore.

A plug gauge means is removably secured to the lower end of the pivotal arm of the apparatus, the plug gauge means fitting within the bore to thereby position the arm in a certain location. In addition, the plug gauge means is provided with a precise outer dimension such that the internal dimension of the bore can be accurately checked. It will of course be realized that if the bore is to have a specific internal dimension, the outer dimension of the plug gauge means can be provided with a similar dimension. In this case, if the plug gauge means fails to enter the bore, it indicates that the bore is of too small an internal dimension. In cases where the bore is to have certain predetermined tolerances, the plug gauge means may be formed of the conventional type known as "go, no-go." In either case, it is apparent that the plug gauge means is adapted to accurately check the internal dimension of the bore.

An additional feature of the present invention is the provision of a two-piece body means wherein the lower supporting portion of the device may be interchanged as

2 desired. The interchangeable lower portions of the body means are provided with supporting leg portions the relative spacing of which is varied such that the lower portions may be interchanged in accordance with the contour of the supporting surface within which the bore or hole is formed, and further according to the size of the bore itself.

A further novel feature of the invention is the provision of an accurately adjustable plug gauge means wherein the outer dimension thereof can be readily adjusted to precisely measure the internal dimensions of bores of different sizes.

The apparatus of the present invention is especially constructed to provide a plurality of components which may be quickly and easily interchanged with one another to obtain maximum versatility and to enable the components to be readily removed and replaced as desired.

Another novel feature of the invention is the fact that the plug gauge means may be so constructed as to have a certain predetermined longitudinal dimension. In this manner, the depth of the bore may be accurately checked to determine that the depth is within predetermined limits.

An object of the present invention is to provide a new and novel bore measuring apparatus which is adapted to precisely measure the angularity of a bore with respect to an associated surface.

Another object of the invention is the provision of internal bore measuring apparatus which is adapted to accurately check the internal diameter of a bore.

A further object of the invention is to provide apparatus for not only measuring the angularity and internal dimension of a bore, but also which may be employed for checking the depth of a bore.

Yet another object of the invention is to provide internal bore measuring apparatus which is readily adjustable such that it may be employed with bores of different sizes.

A still further object of the invention is the provision of internal bore measuring apparatus which is quite simple, compact and inexpensive in construction, yet which is quite reliable in operation.

A still further object of the invention is to provide internal bore measuring apparatus including a multiplicity of components which are readily interchangeable with one another.

Figure 2:
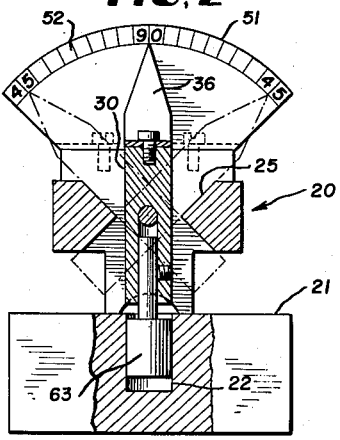
Figure 3:
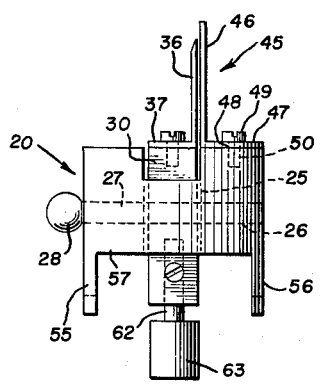
Figure 4:
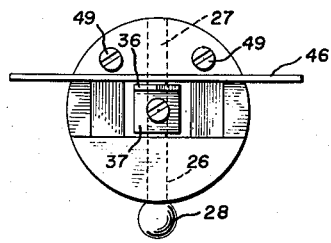
Figure 5:
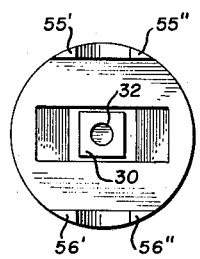
Figure 6:
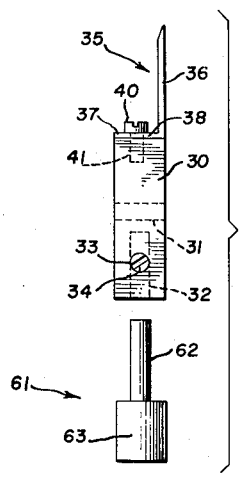

Other objects and many attendant advantages of the invention will become more apparent when considered in connection with the specifications and accompanying drawings wherein:

FIG. 1 is an elevation of a first employment of the apparatus illustrated in operative position, FIG. 2 is a longitudinal sectional view of a portion of the apparatus shown in FIG. 1, FIG. 3 is a side view of the apparatus shown in FIG. 1, FIG. 4 is a top view of the apparatus shown in FIG. 1, FIG. 5 is a bottom view of the apparatus shown in FIG. 1, FIG. 6 is an exploded view illustrating the pivotal arm and detachable plug gauge means of the apparatus shown in FIG. 1, FIG. 7 is an elevation of a modified form of the invention, FIG. 8 is a side view of the apparatus shown in FIG. 7, FIG. 9 is a view partly in section of the pivotal arm along with the pivot pin and indicator member of the apparatus shown in FIG. 7, FIG. 10 is an elevation of a still further modified form of the invention, FIG. 11 is a side view of the apparatus shown in FIG. 10,

3

Figure 12:
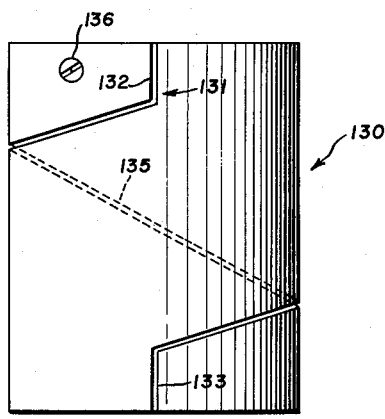
Figure 13:
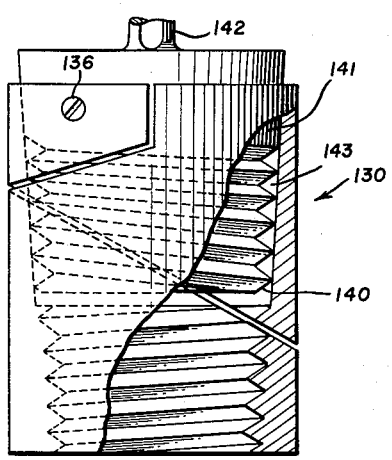
Figure 15:
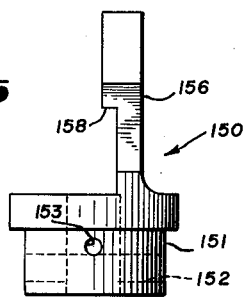
Figure 16:
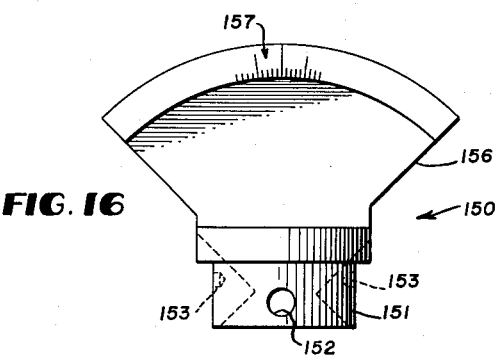
Figure 17:
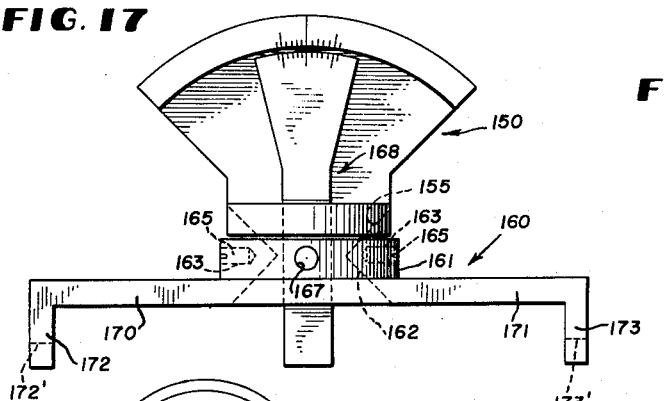
Figure 18:
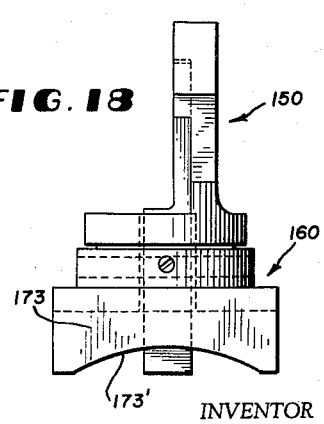
Figure 14:
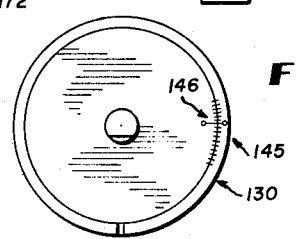

FIG. 12 is an elevation of an adjustable plug gauge member for use with the present invention, FIG. 13 is a view partly broken away illustrating the member shown in FIG. 12 in cooperation with an expander means, FIG. 14 is a top view of the assembly shown in FIG. 13, FIG. 15 is a side view of the top portion of a two-piece body means according to the invention, FIG. 16 is a front view of the member shown in FIG. 15, FIG. 17 is a view illustrating the top portion shown in FIGS. 15 and 16 in operative relationship with a lower body portion, FIG. 18 is a side view of the apparatus shown in FIG. 17.

Referring now to the drawings wherein like reference characters designate corresponding parts throughout the several views, the first modification shown in FIGS. 1–6 includes a body means indicated generally by reference numeral 20, the body means being shown as resting upon the upper surface 21 of any member having a bore 22 formed therein which it is desired to check. It is noted that the body means rests on the upper surface 21 of the member having the bore formed therein, and as mentioned previously, the body means will be supported in such position regardless of whether the surface 21 is flat as shown, or is curved as may sometimes be the case.

The body member 20 is provided with a laterally extending slot indicated by reference numeral 25, this slot defining a more or less X shaped cross section as may be most clearly seen in FIG. 2 thereby permitting pivotal movement of a supported arm with respect to the body means such that the arm can swing through an arc of at least 90°. A bore 26 extends from the front to the rear of the body means as seen most clearly in FIG. 3 and a pivot pin 27 is journalled within this bore and suitably retained in position therein, pin 27 having an enlarged head 28 formed at one end thereof.

An arm 30 is disposed within the slot, and has a front to back dimension slightly less than that of the slot thereby permitting ready pivotal movement with respect to the body means. The arm 30 as seen most clearly in FIG. 6 is provided with a bore 31 extending from front to back thereof and a second bore 32 is formed in the lower surface of the arm and extends upwardly therein to a point below point 31. A threaded bore 33 is formed in the arm and extends radially into communication with the bore 32, a set screw 34 being threadedly disposed within bore 33 for a purpose hereinafter described.

An indicator member indicated generally by reference numeral 35 includes an upstanding portion 36 which tapers to a point thereby serving to visually indicate the regular position of the indicator means, and a lower arm 37 is provided at right angles to portion 36. An opening 38 is provided in arm 37, and a screw 40 extends downwardly in opening 38 into a threaded opening 41 formed in the upper surface of arm 30. In this manner the indicator means 35 may be readily attached to or removed from the arm 30 thereby permitting the indicator means to be exchanged as desired. It is of course also apparent that the indicator means 35 may be formed as an integral portion of the arm if desired.

When the arm 30 is in operative position as shown in FIGS. 1–3, the pivot pin 27 extends through the bore 31 of the arm and pivotally supports the arm with respect to the body means.

A further indicating means is illustrated generally by reference numeral 45 and includes an upstanding arm 46 as well as an integral arm 47 extending substantially normally to arm 46. As shown, arm 47 is provided with a pair of openings 48, and a pair of screws 49 are threaded downwardly through the openings in arm 47 into cooperating threaded openings 50 formed in the body

4 means. In this manner, the indicating means 45 is removably attached to the body means and can be interchanged whenever it is desired to provide different scales or the like. As seen in FIGS. 1 and 2, the upper edge 51 of arm 46 is of generally arcuate configuration, and a scale 52 is formed on portion 46 adjacent the arcuate periphery 51 thereof. As shown, the scale is so marked that 90° appears at the central portion of the scale, and 45° is marked at a 45° relationship to either side of the 90° mark. It is evident that the pointed indicator portion 36 cooperates with the scale to indicate the angular relationship of the bore with respect to the supporting surface 21. Accordingly, if the bore is formed at an angle of 90° with respect to surface 21, a reading of 90° will be obtained.

As seen in FIG. 3, body means 20 is provided with a depending flange 55 at the front portion thereof and a depending flange 56 is formed at the rear thereof. These flanges serve to elevate the under surface 57 of the body means a substantial distance above the supporting surface with which the apparatus is associated. As seen especially in FIG. 1, flange 55 is provided with an arcuate cut-out portion 60 at the central area thereof thereby providing a first leg portion 55' and a second leg portion 55". In a similar manner the rear flange 56 is cut away at the central lower portion thereof to provide a pair of spaced leg members.

It is accordingly apparent that the lower portion of the body means includes four spaced leg portions 55', 55", 56' and 56" as seen clearly in FIG. 5 of the drawings. These four spaced leg members serve to firmly support the body means operative position, and it is evident that they will support the body means either on a flat surface as shown or a curved surface, and that accurate measurements may be obtained in either case.

Referring again to FIG. 6, a plug gauge means is indicated generally by reference numeral 61, the gauge including an upper cylindrical shank portion 62 which is received within the bore 32 of arm 30 and held in place by set screw 34. Gauge means 61 also includes a lower portion 63 which is provided with a precise outer dimension which corresponds to the desired dimension of the bore to be checked. For example, if the bore should have a certain predetermined diameter, portion 63 will be provided with the corresponding diameter, and when the measuring apparatus is to be employed with the hole or bore, the lower portion 63 must first enter the bore thereby indicating that the bore is not of a less diameter than desired.

Referring now to FIGS. 7–9 which illustrate a further modification of the invention, the basic principles remain substantially the same, but the structure has been altered somewhat in order to provide a more compact structure, and one which may be quite easily assembled and disassembled. In this modification, the body means is indicated generally by reference numeral 65 and includes laterally extending slots 66 formed therein in a manner similar to the slot 25 formed in the apparatus previously described. An arm member 70 as seen in FIG. 9 is disposed for pivotal movement within the slot, the arm 70 having a bore 71 formed therethrough which receives a pivot pin 72. A bore 73 is formed through the body means as seen in FIG. 8, and the pin 72 is journalled within this bore and suitably held in place therein.

As seen in FIG. 9, a radially extending bore 75 is provided in pivot pin 72 and a bore 76 formed in the arm member 70 is aligned therewith. Bore 76 is then in communication with an enlarged bore 77 which is threaded and which opens to the upper surface of the arm. A locking pin includes an enlarged threaded head 78 which is received within the threaded bore 77, and also includes a depending shank portion 80 which extends through aligned bores 76 and 75 formed in the arm and the pivot pin respectively. It is apparent that the locking pin retains the arm and pivot pin in operative relationship to one another.

The lower portion of arm 70 includes an upwardly extending bore 81 for receiving the upper portion of a plug gauge means, and a set screw 82 is adjustably mounted within a radially extending threaded opening 83 which communicates with bore 81. It is evident that this structure permits various plug gauge means to be adjustably attached to the arm.

As seen in FIGS. 7 and 8, a dial plate 85 is attached to the forward end of the body means by means of a pair of screws 86 which extend through suitable openings in the dial plate and into correspondingly threaded openings in the body means. Dial plate 85 is provided with a scale indicated by reference numeral 87 in FIG. 7 along the lower arcuate edge portion 88 thereof.

Pivot pin 72 is also provided with a radially extending bore 90, and a longitudinally extending bore 91 communicates with bore 90. A pointer or indicator member 92 is removably disposed within bore 90, and a set screw 93 is mounted within bore 91 for retaining the indicator member 92 in operative position as shown wherein indicator member 92 extends parallel with arm 70 such that it accurately reflects angular movements of the arm 70. It is also evident that indicator 92 cooperates with the scale on the dial plate 85 for indicating the angular relationship of the bore when the device is in operation.

It will also be noted that the lower portion of body means 65 is provided with front and rear flanges 95 and 96 which are cut away at the central portion thereof in the manner of the device shown in FIGS. 1-3 to provide four spaced leg portions, two of which are indicated by reference numerals 95' and 95" in FIG. 7.

Referring now to FIGS. 10 and 11 of the drawings, a further modification is illustrated wherein the body means is indicated generally by reference numeral 100, the body means benig provided with a lower supporting portion 101 having four spaced legs formed as previously described and the body means also having a slot 102 formed therein. An arm 105 is disposed within a slot and is supported by a pivot pin 106 mounted within a suitable bore 107 formed in the body means. The pin 106 extends through a suitable bore formed in the arm, and a set screw 110 extends downwardly through a vertically extending bore 111 formed in the arm for removably attaching the arm to the pivot pin 106.

Secured integrally to the upper surface of the body means is an upstanding dial plate 115 having an arcuate upper edge 116, the plate being undercut at 117 to provide a cutout portion for receiving an upstanding portion 120 of the arm 105. The upper edge of portion 120 of the arm is also of an arcuate configuration and is provided with a scale 121 formed along the edge thereof. A scale 122 is formed along the forward edge of the upper part 125 of dial plate 115, and it is apparent that a reading may be obtained by observing the scales formed on the two members. If desired, the scales may comprise vernier scales or the like in order to obtain more accurate readings.

In this modification just as in the previous modifications, a plug gauge means 126 is removably attached to the lower end of the arm and is adapted to be inserted within the bore to be measured, it being undersood that here again the plug gauge means is of a precise outer dimension.

Referring now to FIGS. 12 and 13 of the drawings, a modification is illustrated depicting an adjustable plug gauge means the outer diameter of which may be readily and accurately adjusted. This adjustable gauge means includes a tubular member indicated generally by reference numeral 130, the tubular member being formed of a suitable resilient material such as spring steel whereby it normally assumes its minimum diameter, and may be expanded to larger sizes as will hereinafter appear.

The tubular member is split longitudinally thereof, and thereby forms a slot indicated by reference numeral 131, the slot including an upper portion 132 and a lower portion 133 which are substantially aligned with one another and which extend a minor portion of the longitudinal dimension of the tubular member. The lower part of slot portion 132 is connected to the upper part of slot portion 133 by a slot portion 135 which defines a substantially helical bar around the outer periphery of the tubular member. It is evident that slot 131 permits the tubular member to expand and contract while at all times retaining an outer configuration defining a cylindrical surface. A radially extending threaded opening is provided through the wall of the tubular member and a set screw 136 is threaded through the opening for a purpose hereinafter described.

As seen most clearly in FIG. 13, the inner surface of tubular member 130 is provided with a lower threaded portion 140, the threaded portion 140 as well as the wall portion thereabove being tapered downwardly and inwardly toward the lower portion of the tubular member.

An expander member 141 includes a shank portion 142 which extends upwardly therefrom and which is adapted to be detachably secured to the lower end portion of the pivoted arm of the apparatus hereinbefore described as will be well understood. The lower portion of expander member 141 is also provided with a tapered thread 143 formed on the outer surface thereof, thread 143 being tapered complementary to the taper of thread 140 such that the threaded portions 143 and 140 are adapted to intercooperate with one another such that upon threading of the expander member 141 downwardly within the tubular member 130, the tubular member will be expanded to any desired diameter.

As seen in FIG. 14, the upper edge of the tubular member 130 is provided with a scale 145, and the upper surface of the expander member 140 is provided with a cooperating scale 146 formed adjacent the outer periphery thereof. The two scales 145 and 146 indicate the relative angular position of the tubular member and the expander member, and the scale is so calibrated as to indicate the outer diameter of the tubular member in accordance with the angular relationship of the expander member to the tubular member, and consequently the degree to which the expander member is threaded downwardly into the tubular member.

It is evident that when utilizing the adjustable plug gauge means illustrated in FIGS. 12-14, the expander member may first be inserted within the tubular member and threaded therein to the desired extent whereupon the tubular member will assume the desired outer diameter for checking a particular size bore. When the tubular member and the expander member have been so adjusted, the two members may be locked in the desired operative position by means of set screws 136.

Referring now to FIGS. 15–18 of the drawings, a modified form of body means is illustrated wherein the body means is formed of two detachable portions.

FIGS. 15—16 illustrate the upper portion of this modified form of the body means, the upper portion being indicated generally by reference numeral 150, and including a lower part 151 having an outer surface of cylindrical configuration. A bore 152 is formed through part 151, is adapted to receive the pivot pin for supporting the pivotal arm in operative position relative to the body means. A pair of threaded openings 153 are formed in diametrically opposite portions of the lower part 151 for receiving a pair of set screws as hereinafter described. A laterally extending slot 155 is also formed through the upper portion 150 of the body means of this modification to permit pivotal movement of the arm when disposed in operative position therewithin.

The upper part of portion 150 is indicated by reference numeral 156 and is generally fan shaped, a scale 157 being formed on the forward surface thereof in a manner similar to the modification shown in FIGS. 10 and 11.

Upper part 156 is also undercut at 158 as seen in FIG. 15 in order to accommodate the adjacent portion of the pivotal arm.

Referring now particularly to FIGS. 17 and 18, the upper portion of this modified form of the body means is shown in operative position with the cooperating lower portion. The lower portion is indicated generally by reference numeral 160 and includes a central boss 161 having a cylindrical opening 162 formed therethrough, opening 162 receiving the cylindrical part 151 of the upper portion 150.

A pair of threaded openings 153 are provided through diametrically opposite portions of the wall of the boss 161, and set screws 165 are threaded within aligned openings 163 of the boss and 153 of the upper portion thereby retaining the upper and lower portions in operative relationship to one another.

A pivot pin 167 extends through aligned openings formed in the boss 161 and the bore 152 of the upper portion, and the pivot arm indicated generally by reference numeral 168 is pivotally supported on this pivoted pin, the lower portion of the arm also being provided with means for detachably securing a gauge means thereto.

Lower portion 160 includes oppositely extending arm portions 170 and 171 having depending flanges 172 and 173 formed integrally at the outer end portions thereof respectively. As seen particularly in FIG. 18, each of the depending flange portions 172 and 173 have a central cut-out portion 172' and 173' to define a pair of spaced leg portions on each flange whereby four spaced legs are provided for supporting the body means in operative position.

The lower portion 160 as shown in FIGS. 17 and 18 is merely illustrative of one particular size lower portion which may be employed with the upper portion. It should be understood that various other lower portions may be provided similar to portion 160, and such other lower portions may be provided with arms similar to arms 170 and 171 which extend laterally to either a greater or lesser extent depending on the size of the bore being tested or other surface characteristics of the supporting surface which may require various distances between the supporting legs.

While each of the modifications of the invention has been shown as associated with a relatively flat surface, it should be understood that the supporting legs can also rest upon a curved surface, and for this purpose the lower surfaces of the supporting legs may be provided with curved configurations or other shapes in order to conform to the supporting surface. In addition, the leg portions could be other than four in number, although this arrangement is considered preferable, and three legs may be employed in certain instances for supporting the body means in operative position.

It is apparent from the foregoing that there is provided a new and novel internal bore measuring apparatus which is particularly adapted to measure several different characteristics of a bore or hole. Firstly, the apparatus is adapted to accurately measure the angularity of a bore with respect to the associated surface upon which the apparatus is adapted to accurately check the internal diameter of the tested bore. Furthermore, the gauge means may be provided with a specific longitudinal dimension so as to accurately measure the depth of the bore. The device includes readily interchangeable and adjustable elements, and in one modification an adjustable gauge means is provided wherein the outer diameter thereof may be readily and precisely varied. The apparatus is quite simple, compact and inexpensive in construction, and yet is very accurate and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Internal bore measuring apparatus comprising a body means, an arm pivotally supported by said body means for movement relative to said body means, said arm and said body means including cooperating indicating means for indicating the relative angular position of the arm with respect to the body means, and plug gauge means removably secured to the lower end portion of said arm, said plug gauge means being so constructed as to have an outer dimension of a precise configuration and dimension in order to accurately check the internal dimensions of the bore to be measured.

2. Internal bore measuring apparatus comprising a body means, an arm pivotally supported by said body means for pivotal movement with respect thereto, said arm and said body means including cooperating indicating means for indicating the relative angular position of the arm with respect to the body means, and an adjustable plug gauge means secured to the lower end portion of said arm, and means for selectively adjusting the outer dimension of said plug gauge means for obtaining variable precise outer dimensions of the plug gauge means.

3. Internal bore measuring apparatus comprising a body means, said body means including a support means comprising a plurality of spaced leg members for supporting the body means in operative position on surfaces of varying contour, an indicating arm pivotally supported by said body means for pivotal movement relative thereto, and adjustable plug gauge means removably attached to the lower end portion of said arm, said plug gauge means having a precise outer diameter for checking the internal diameter of a bore.

4. Internal bore measuring apparatus comprising a body means, said body means including a lower support portion comprising a plurality of spaced leg members, said body means having formed therein at least one elongated slot, an arm pivotally supported by said body means and disposed within said slot whereby the arm is adapted to pivot with respect to said body means, the lower end portion of said arm including means for removably attaching a plug gauge means thereto, and an adjustable plug gauge means adapted to be secured to said arm, said plug gauge means having a precise outer dimension for checking the internal dimension of a bore to be tested.

5. Internal bore measuring apparatus including a body means, said body means comprising an upper portion and a separate lower portion, means for detachably securing said upper and lower portions rigidly to one another, said lower portion including a plurality of spaced leg members for supporting the body means in operating position, said upper portion including a scale formed thereon, said body means having a slot formed therethrough, an arm member disposed within said slot and supported by said body means for pivotal movement relative thereto, said arm including an upper portion for cooperation with the scale of the upper portion of the body means for indicating the relative angular position of the arm with respect to the body means, means at the lower portion of the arm for removably attaching a plug gauge means to, and a plug gauge means aadpted to be secured to the lower portion of said arm, said plug gauge means having a precise outer dimension for accurately checking the internal dimension of a bore to be measured.

6. Internal bore measuring apparatus comprising a body means, an arm pivotally supoprted by said body means for pivotal movement relative thereto, said arm and said body means including cooperating indicating means for indicating the relative angular position of the body means and the arm, and adjustable plug gauge means secured to the lower end of the arm, said plug gauge means having a substantially cylindrical outer surface, said plug gauge means having a slot formed therein permitting expansion and contraction thereof, and means for selectively varying the outer dimension of said gauge means.

7. Apparatus as defined in claim 6 wherein said adjustable plug gauge means has an inner bore provided with a tapered thread, and said means for adjustably varying the outer dimension of the gauge means is provided with an external tapered thread for cooperation with the aforementioned tapered thread.

8. An adjustable plug gauge means for use with an internal bore measuring apparatus including a tubular member formed of resilient material and having a substantially cylindrical outer surface, said member being split longitudinally thereof throughout the length thereof by a slot the major portion of which is helical in configuration to permit uniform radial expansion and contraction, the internal surface of said tubular member being provided with an internal thread tapering toward one end thereof, and expander means for selectively expanding said tubular member, said expanding means having a thread formed on the outer surface thereof, said last-mentioned thread being tapered complementary to the taper formed on said tubular member.

References Cited in the file of this patent
UNITED STATES PATENTS

| | | |
|---|---|---|
| 86,308 | Jones | Jan. 26, 1869 |
| 1,852,760 | Sisson | Apr. 5, 1932 |
| 1,965,131 | Simpson | July 3, 1934 |
| 2,200,181 | Lamond | May 7, 1940 |
| 2,546,532 | Wade | Mar. 27, 1951 |
| 2,706,338 | Ackerman et al. | Apr. 19, 1955 |
| 2,714,256 | Watson | Aug. 2, 1955 |
| 2,767,478 | Adams | Oct. 23, 1956 |

OTHER REFERENCES

Popular Science Monthly, June 1930, page 119, "An Adjustable Gauge for Small Holes."